(12) United States Patent
Kobayashi et al.

(10) Patent No.: US 12,269,917 B2
(45) Date of Patent: Apr. 8, 2025

(54) CURABLE RESIN COMPOSITION

(71) Applicant: ADEKA CORPORATION, Tokyo (JP)

(72) Inventors: Shota Kobayashi, Kuki (JP); Ken-ichi Tamaso, Kuki (JP); Ryo Ogawa, Kuki (JP); Tamotsu Nagamatsu, Kuki (JP)

(73) Assignee: ADEKA CORPORATION, Tokyo (JP)

( * ) Notice: Subject to any disclaimer, the term of this patent is extended or adjusted under 35 U.S.C. 154(b) by 339 days.

(21) Appl. No.: 17/436,498

(22) PCT Filed: Mar. 27, 2020

(86) PCT No.: PCT/JP2020/013956
§ 371 (c)(1),
(2) Date: Sep. 3, 2021

(87) PCT Pub. No.: WO2020/196819
PCT Pub. Date: Oct. 1, 2020

(65) Prior Publication Data
US 2022/0185946 A1   Jun. 16, 2022

(30) Foreign Application Priority Data
Mar. 27, 2019 (JP) ................. 2019-060745

(51) Int. Cl.
C08G 59/24 (2006.01)
B29C 71/02 (2006.01)
C08G 59/40 (2006.01)
C08G 59/56 (2006.01)
C08G 59/66 (2006.01)
C08G 59/68 (2006.01)
C08J 7/12 (2006.01)

(52) U.S. Cl.
CPC ....... *C08G 59/245* (2013.01); *C08G 59/4028* (2013.01); *C08G 59/4064* (2013.01); *C08G 59/56* (2013.01); *C08G 59/66* (2013.01); *C08G 59/68* (2013.01); *C08J 7/08* (2013.01); *C08J 7/123* (2013.01); *C08G 2170/00* (2013.01)

(58) Field of Classification Search
CPC ............. C08G 59/245; C08G 59/4028; C08G 59/4064; C08G 59/56; C08G 59/66; C08G 59/68; C08G 2170/00; C08G 59/50; C08G 59/26; C08J 7/08; C08J 7/123; C09J 163/00
See application file for complete search history.

(56) References Cited

U.S. PATENT DOCUMENTS

| | | | |
|---|---|---|---|
| 4,220,513 A | * | 9/1980 | Green .................. C08G 75/045 522/170 |
| 10,655,005 B2 | | 5/2020 | Endo |
| 2009/0076180 A1 | | 3/2009 | Iwaya |
| 2018/0051167 A1 | | 2/2018 | Endo |

FOREIGN PATENT DOCUMENTS

| | | |
|---|---|---|
| JP | 54-116096 | 9/1979 |
| JP | 3-174433 | 7/1991 |
| JP | 2009-51945 | 3/2009 |
| JP | 2009-051954 | 3/2009 |
| JP | 2011-154052 | 8/2011 |
| JP | 2018044069 A | 3/2018 |
| JP | 2018-519367 | 7/2018 |
| JP | 2018-168329 | 11/2018 |
| JP | 2019038989 A | 3/2019 |
| WO | 2009/151050 | 12/2009 |
| WO | 2016/121750 | 8/2016 |
| WO | 2016152839 A1 | 9/2016 |
| WO | 2018/181421 | 10/2018 |

OTHER PUBLICATIONS

International Search Report for PCT/JP2020/013956 dated Jun. 16, 2020, 7 pages.
Written Opinion of the ISA for PCT/JP2020/013956 dated Jun. 16, 2020, 4 pages.

* cited by examiner

*Primary Examiner* — Andrew J. Oyer
(74) *Attorney, Agent, or Firm* — NIXON & VANDERHYE

(57) ABSTRACT

Disclosed is a curable resin composition that has excellent curability by irradiation of light and heating and that is suitable for such applications as liquid encapsulants, liquid adhesives, adhesives for camera modules, and liquid crystal sealants. The curable resin composition contains (A) an aromatic epoxy resin having an allyl group, (B) a thiol-based curing agent, (C) a photoradical initiator, and (D) a thermally latent curing agent. Preferably, (A) the compound having an allyl group and an epoxy group is an aromatic epoxy resin having an allyl group. Preferably, the thiol-based curing agent, which is component (B), is in liquid form at 25° C.

11 Claims, No Drawings

CURABLE RESIN COMPOSITION

This application is the U.S. national phase of International Application No. PCT/JP2020/013956 filed Mar. 27, 2020 which designated the U.S. and claims priority to JP Patent Application No. 2019-060745 filed Mar. 27, 2019, the entire contents of each of which are hereby incorporated by reference.

BACKGROUND OF THE INVENTION

Field of the Invention

The present invention relates to a curable resin composition that is curable by light and heat and that can suitably be used for various applications, such as liquid crystal sealants and adhesives for camera modules.

Description of the Related Art

Epoxy resins are used in various fields, such as adhesives, tackifiers, encapsulants, paint, coating agents, and molding materials.

As mobile devices such as smartphones have become thinner in recent years, camera modules installed in mobile devices such as smartphones have also become smaller. Downsizing of camera modules have led to miniaturization of parts that join constituent members of such camera modules. Thus, an adhesive layer formed by an adhesive for joining such constituent members needs to have high adhesive strength.

Further, adhesives used for assembling camera modules etc. need to have low-temperature curability to avoid thermal damage to image sensors etc. that may otherwise occur due to high-temperature treatment. At the same time, short-time curability is also required from the viewpoint of improving production efficiency. From these viewpoints, UV-curable adhesives and thermosetting epoxy resin-based adhesives are widely used as low-temperature short-time curable adhesives. UV-curable adhesives can cure quickly, but unfortunately, they are not usable for bonding portions that cannot be irradiated by light. On the other hand, although thermosetting epoxy resin-based adhesives are curable at low temperatures in a short time, they are not always satisfactory, because the components (members) to be bonded together need to be fixed with a tool or device in order to maintain their posture/orientation during bonding. Also, the temperature rise caused by heating leads to a decrease in the adhesive's viscosity, which may cause the adhesive to drip immediately before being cured or to flow to undesired parts.

To overcome the aforementioned problems, another type of adhesive has been proposed, wherein the adhesive is temporarily fixed by being cured (pre-cured) by irradiation with light, and then further cured (post-cured) by heat. For example, Patent Literature 1 proposes an optically and thermally curable composition containing a curable component consisting of a compound having a glycidyl group and a (meth)acryloyl group, a polythiol compound, and an epoxy curing accelerator. Patent Literature 2 proposes a latent curing-type epoxy resin composition containing an epoxy resin, a cation polymerization photo-initiator, and a heatset anion curing agent. Patent Literature 3 proposes a curable composition containing a compound having a (meth)acryloyl group, a polythiol compound, a photoradical generator, and a latent curing agent, and also discloses a compound having a (meth)acryloyl group and an epoxy group.

However, the epoxy (meth)acrylates suggested in the aforementioned documents are, considering their production methods, a mixture of polyepoxy resin and poly(meth)acrylic resin, and are thus not satisfactory in terms of their effect of improving adhesiveness. Also, since epoxy (meth)acrylate has high viscosity, a curable resin composition obtained by using the same will also suffer from high viscosity.

CITATION LIST

Patent Literature

Patent Literature 1: JP 2009-51954A
Patent Literature 2: US 2009/076180A1
Patent Literature 3: WO 2018/181421

SUMMARY OF INVENTION

Technical Problem

An objective of the present invention is to provide a curable resin composition having excellent photo- and heat-curability and also capable of providing an encapsulant or adhesive having low viscosity and excellent storage stability.

SUMMARY OF THE INVENTION

The aforementioned objective of the invention is achieved by a curable resin composition containing: (A) a compound having an allyl group and an epoxy group; (B) a thiol-based curing agent; (C) a photoradical initiator; and (D) at least one type of compound selected from the group consisting of thermally latent curing agents and curing catalysts.

In the curable resin composition of the invention, preferably, (A) the compound having an allyl group and an epoxy group is an aromatic epoxy resin having an allyl group.

In the curable resin composition of the invention, preferably, the aromatic epoxy resin having an allyl group contains a benzene ring, and the allyl group is located at an ortho position with respect to the epoxy group.

In the curable resin composition of the invention, preferably, the compound which is component (A) is a compound represented by formula (1) below.

[Chem. 1]

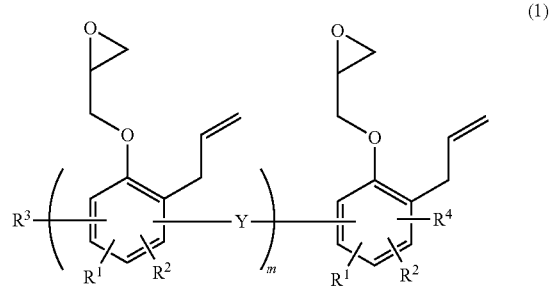

(1)

(In the formula, m represents 0 or a positive number, Y represents —S— or an unsubstituted or fluorine-substituted divalent hydrocarbon group, and $R^1$, $R^2$, $R^3$, and $R^4$ each independently represent a hydrogen atom, a $C_{1-4}$ alkyl group, an allyl group, or a glycidyloxy group.)

In the curable resin composition of the invention, preferably, Y in the formula (1) is at least one selected from the group consisting of formulas (Y-1) to (Y-9) below.

[Chem. 2]

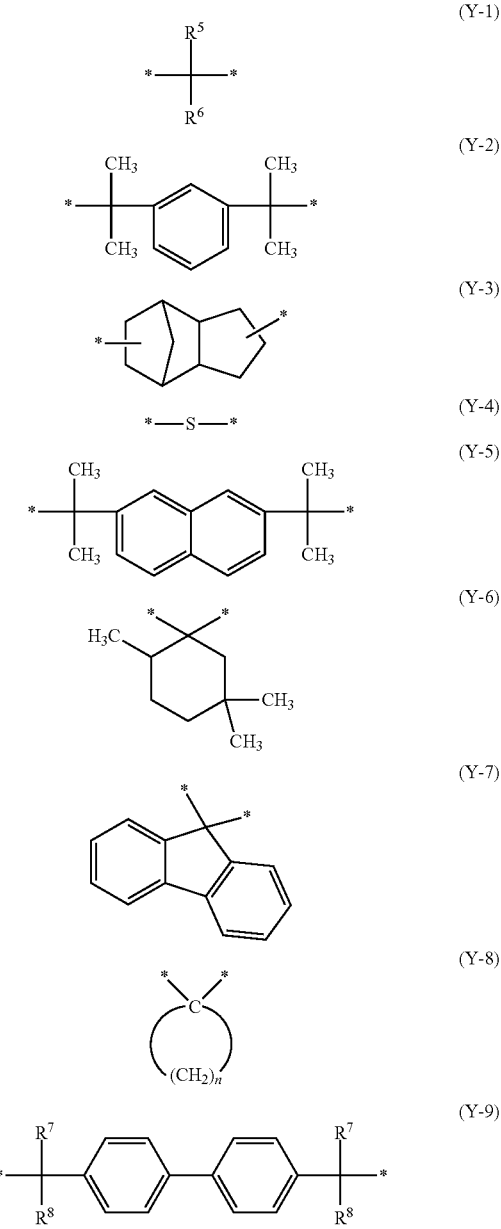

(In the formulas, n represents an integer from 4 to 12, $R^5$, $R^6$, $R^7$, and $R^8$ each independently represent a hydrogen atom or an unsubstituted or fluorine-substituted methyl group, and * represents a bonding site.)

In the curable resin composition of the invention, preferably, the thiol-based curing agent represented by component (B) is a thiol-based curing agent that is in liquid form at 25° C.

In the curable resin composition of the invention, preferably, the thiol-based curing agent which is the component (B) is a polythiol compound.

In the curable resin composition of the invention, preferably, the polythiol compound is a polythiol ether of a polyol, or a polythiol having a heterocycle containing at least one nitrogen in a ring thereof.

In the curable resin composition of the invention, it is preferable to contain, per 1 equivalent of the allyl group in the component (A), from 0.5 to 1.5 equivalents of the thiol-based curing agent which is the component (B).

In the curable resin composition of the invention, preferably, the photoradical initiator which is the component (C) is at least one type of compound selected from the group consisting of acetophenone-based compounds, benzil-based compounds, benzophenone-based compounds, thioxanthone-based compounds, and oxime ester-based compounds.

In the curable resin composition of the invention, preferably, the component (C) is an aminoacetophenone-based compound.

In the curable resin composition of the invention, preferably, the component (D) is a modified amine-based curing agent.

In the curable resin composition of the invention, preferably, the modified amine-based curing agent is a polyepoxy and/or isocyanate adduct of an amine compound containing at least one active hydrogen.

The present invention also provides a method for curing a curable resin composition, involving: a step of pre-curing the aforementioned curable resin composition by light; and a step of curing the pre-cured curable resin composition by heat.

The present invention also provides a cured product obtained by first pre-curing the aforementioned curable resin composition by light, and then curing the same by heat.

Advantageous Effects of Invention

The present invention can provide a curable resin composition having excellent photocurability and excellent heat-curability. The curable resin composition can be subjected to dual curing, wherein the composition is first pre-cured by light, and then post-cured by heat. These features make the present curable resin composition useful in such applications as liquid encapsulants, liquid adhesives, adhesives for camera modules, liquid crystal sealants, etc.

DESCRIPTION OF THE PREFERRED EMBODIMENTS

A curable resin composition according to the present invention will be described in detail below.

The curable resin composition according to the present invention contains (A) a compound having an allyl group and an epoxy group (also referred to hereinafter as "component (A)"). The compound having an allyl group and an epoxy group, serving as component (A), is not particularly limited, and may include, for example, an aromatic epoxy resin having an allyl group, or a compound having an allyl group and an epoxy group in a heterocyclic framework. In the present invention, an aromatic epoxy resin having an allyl group is preferred from the viewpoint of excellent heat resistance and the epoxy group's excellent reactivity.

The aromatic epoxy resin having an allyl group may contain a monocyclic aromatic ring, such as a benzene ring, or may contain a fused aromatic ring, such as a naphthalene ring. In cases where component (A) is the aforementioned aromatic epoxy resin, a single epoxy group may be bonded to an aromatic ring in the aromatic epoxy resin, or two or more epoxy groups may be bonded thereto. A single allyl group may be bonded to the aromatic ring to which the epoxy group(s) is/are bonded, or two or more allyl groups may be bonded thereto. As regards the ratio between the epoxy group(s) and the allyl group(s) in the aromatic epoxy resin, it is preferable that there are from 0.5 to 3 allyl groups, more preferably one allyl group, per one epoxy group, from the viewpoint of even better curability.

In the present invention, from the viewpoint of easy availability of materials, it is preferable that the aromatic epoxy resin contains a benzene ring. In cases where the aromatic epoxy resin contains a benzene ring, it is preferable that an allyl group is located at least at an ortho position with respect to the epoxy group, and more preferably, an allyl group is located only at an ortho position with respect to the epoxy group.

A preferred example of the aromatic epoxy resin having an allyl group may be a compound represented by formula (1) below.

[Chem. 3]

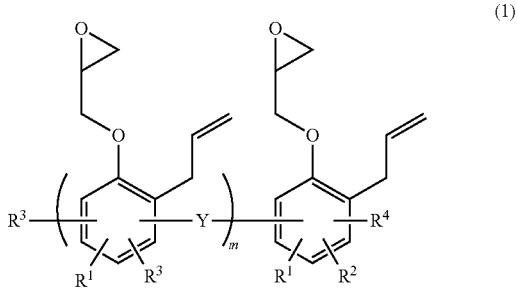

(1)

(In the formula, m represents 0 or a positive number, Y represents —S— or an unsubstituted or fluorine-substituted divalent hydrocarbon group, and $R^1$, $R^2$, $R^3$, and $R^4$ each independently represent a hydrogen atom, a $C_{1-4}$ alkyl group, an allyl group, or a glycidyloxy group.)

Examples of the $C_{1-4}$ alkyl group represented by $R^1$, $R^2$, $R^3$, and $R^4$ in formula (1) may include: linear alkyl groups, such as methyl, ethyl, propyl, butyl, etc.; and branched alkyl groups, such as isopropyl, secondary butyl, tertiary butyl, isobutylmethyl, etc.

Examples of the divalent hydrocarbon group represented by Y in formula (1) may include alkylene groups, cycloalkylene groups, cycloalkylene alkylene groups, arylene groups, arylene alkylene groups, etc.

It is preferable that the alkylene group contains from 1 to 30 carbon atoms. The alkylene group may be linear or branched. Examples of linear alkylene groups may include divalent groups obtained by removing one hydrogen atom from a linear alkyl group such as methyl, ethyl, propyl, butyl, amyl, hexyl, heptyl, octyl, nonyl, decyl, undecyl, dodecyl, tetradecyl, hexadecyl, octadecyl, eicosyl, etc. Examples of branched alkylene groups may include divalent groups obtained by removing one hydrogen atom from a branched alkylene group such as isopropyl, isobutyl, s-butyl, t-butyl, isoamyl, t-amyl, isooctyl, 2-ethylhexyl, t-octyl, isononyl, isodecyl, etc. The alkylene group is preferably a linear alkylene group.

It is preferable that the cycloalkylene group contains from 6 to 30 carbon atoms. The cycloalkylene group may be monocyclic or polycyclic. Examples of monocyclic cycloalkylene groups may include divalent groups obtained by removing one hydrogen atom from a monocyclic cycloalkyl group such as cyclopropyl, cyclobutyl, cyclopentyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, cyclooctadecyl, cyclononadecyl, cycloeicosyl, etc. Examples of polycyclic cycloalkylene groups may include divalent groups obtained by removing one hydrogen atom from a polycyclic cycloalkyl group such as adamantyl, decahydronaphthyl, octahydropentalene, bicyclo[1.1.1]pentanyl, tetradecahydroanthracenyl, etc. The cycloalkylene group is preferably a polycyclic cycloalkylene group.

In the present invention, a cycloalkylene alkylene group refers to a divalent group including, in combination, one or more alkylene groups and one or more cycloalkylene groups. It is preferable that the cycloalkylene alkylene group contains from 7 to 30 carbon atoms. The cycloalkylene group in the cycloalkylene alkylene group may be monocyclic or polycyclic. Examples of monocyclic cycloalkylene alkylene groups may include: divalent groups obtained by removing one hydrogen atom from a group in which one or more hydrogen atoms in the aforementioned alkyl group has been substituted by the aforementioned monocyclic cycloalkyl group; or divalent groups obtained by removing one hydrogen atom from a group in which two or more hydrogen atoms in the aforementioned monocyclic cycloalkyl group have been substituted by the aforementioned alkyl group. Examples of polycyclic cycloalkylene alkylene groups may include: divalent groups obtained by removing one hydrogen atom from a group in which one or more hydrogen atoms in the aforementioned alkyl group has been substituted by the aforementioned polycyclic cycloalkyl group; or divalent groups obtained by removing one hydrogen atom from a group in which two or more hydrogen atoms in the aforementioned polycyclic cycloalkyl group have been substituted by the aforementioned alkyl group. In the present invention, it is preferable that the cycloalkylene alkylene group is a monocyclic cycloalkylene alkylene group.

It is preferable that the arylene group contains from 6 to 30 carbon atoms. The arylene group may be monocyclic or fused-ring. Examples of monocyclic arylene groups may include divalent groups obtained by removing one hydrogen atom from a monocyclic aryl group such as phenyl, biphenylyl, etc. Examples of fused-ring arylene alkylene groups may include divalent groups obtained by removing one hydrogen atom from a fused-ring aryl group such as naphthyl, anthryl, phenanthrenyl, fluorene, etc. The arylene group is preferably a fused-ring arylene group.

In the present invention, an arylene alkylene group refers to a divalent group including, in combination, one or more alkylene groups and one or more arylene groups. It is preferable that the arylene alkylene group contains from 7 to 30 carbon atoms. The arylene group in the arylene alkylene group may be monocyclic or a fused ring. Examples of monocyclic arylene alkylene groups may include: divalent groups obtained by removing one hydrogen atom from a group in which one or more hydrogen atoms in the aforementioned alkyl group has been substituted by the aforementioned monocyclic aryl group; or divalent groups obtained by removing one hydrogen atom from a group in which two or more hydrogen atoms in the aforementioned monocyclic aryl group have been substituted by the aforementioned alkyl group. Examples of fused-ring arylene alkylene groups may include: divalent groups obtained by removing one hydrogen atom from a group in which one or more hydrogen atoms in the aforementioned alkyl group has been substituted by the aforementioned fused-ring aryl group; or divalent groups obtained by removing one hydrogen atom from a group in which two or more hydroatoms in the aforementioned fused-ring aryl group have been substituted by the aforementioned alkyl group. The arylene alkylene group is preferably a monocyclic arylene alkylene group or a fused-ring arylene alkylene group.

In the present invention, Y in the aforementioned formula (1) is preferably at least one selected from the group consisting of formulas (Y-1) to (Y-9) below.

[Chem. 4]

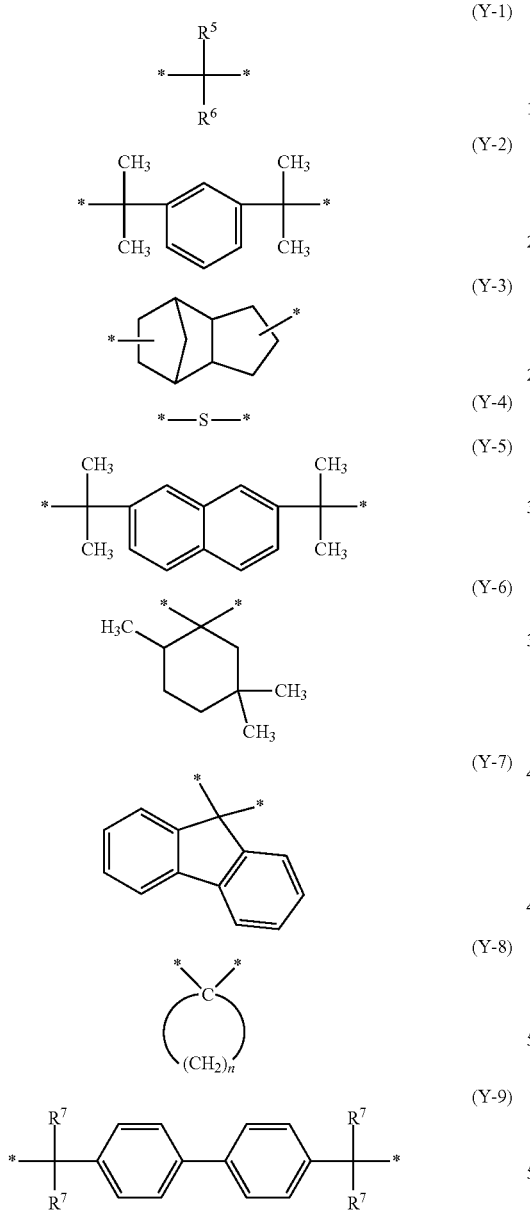

(In the formulas, n represents an integer from 4 to 12, $R^5$, $R^6$, $R^7$, and $R^8$ each independently represent a hydrogen atom or an unsubstituted or fluorine-substituted methyl group, and * represents a bonding site.)

The fluorine-substituted methyl group represented by $R^5$, $R^6$, $R^7$, and $R^8$ in formula (1) may be monofluoromethyl, difluoromethyl, or trifluoromethyl.

In the present invention, compounds wherein Y is Y-1 are particularly preferable from the viewpoint of low viscosity.

Among compounds wherein Y is Y-1, compounds wherein $R^5$ is a hydrogen atom are preferred from the viewpoint of easy availability of materials.

In formula (1), m represents 0 or a positive number. In cases where m is an integer, from the viewpoint of low viscosity, it is preferable that m is greater than 0 to 10 or less, more preferably greater than 0 to 5 or less, even more preferably greater than 0 to 3 or less, further preferably greater than 0 to 1 or less, particularly preferably greater than 0 to 0.5 or less. In formula (1), m can be determined, for example, from the charge ratio of materials such as allylphenols and/or aldehydes used for producing the compound represented by formula (1).

A compound represented by formula (1) can be obtained easily by, for example, epoxidizing, with epichlorohydrin, a phenol having an allyl group such as MEH-8000H (allylphenol novolac; from Meiwa Plastic Industries, Ltd.).

In the present invention, from the viewpoint of easy availability of materials, it is preferable that $R^1$, $R^2$, $R^3$, and $R^4$ in formula (1) are each a hydrogen atom.

From the viewpoint of easy availability of materials, it is preferable that the compound having an allyl group and an epoxy group in a heterocyclic framework is a compound represented by formula (2) below.

[Chem. 5]

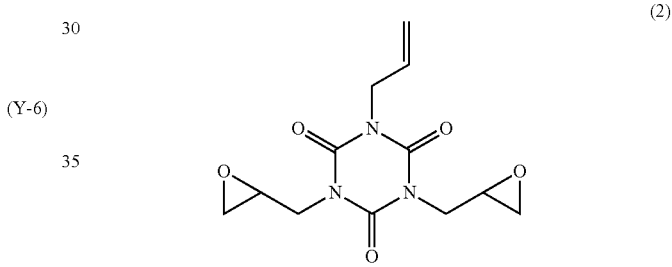

(2)

In the curable resin composition of the present invention, it is preferable that the compound having an allyl group and an epoxy group, which is component (A), has an epoxy equivalent of from 50 to 500 g/eq., more preferably from 80 to 400 g/eq., even more preferably from 100 to 300 g/eq., from the viewpoint of even better curability.

The curable resin composition of the present invention may further contain, in addition to component (A), other polymerizable compound(s) different from component (A) and curable by heating or irradiation of light. Examples of other polymerizable compound(s) may include epoxy resins not encompassed by component (A), and radical-polymerizable compounds not encompassed by component (A). Note, however, that, in cases where the curable resin composition of the present invention contains other polymerizable compound(s), it is preferable that the content of other polymerizable compound(s) in the curable resin composition does not exceed 100 parts by mass, more preferably does not exceed 50 parts by mass, further preferably does not exceed 10 parts by mass, with respect to 100 parts by mass of component (A), because the effects of the present invention may not be exerted sufficiently.

Examples of epoxy resins not encompassed by component (A) may include: polyglycidyl ether compounds of mononuclear polyhydric phenol compounds, such as hydroquinone, resorcin, pyrocatechol, phloroglucinol, etc.; polyglycidyl ethers of polyols, such as ethylene glycol, propylene glycol, butylene glycol, hexanediol, polyglycol, thiodiglycol, glycerin, trimethylol propane, pentaerythritol, sorbitol, bisphenol A-alkylene oxide adduct, etc.; glycidyl esters of aliphatic, aromatic or alicyclic polybasic acids, such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesic acid, pyromellitic acid, tetrahydrophthalic acid, hexahydrophthalic acid, endomethylene tetrahydrophthalic acid, etc.; homopolymers or copolymers of glycidyl methacrylate; epoxidized products of cyclic olefin compounds, such as vinylcyclohexene diepoxide, dicyclopentanediene diepoxide, 3,4-epoxycyclohexylmethyl-3,4-epoxycyclohexane carboxylate, 3,4-epoxy-6-methylcyclohexylmethyl-6-methylcyclohexane carboxylate, bis(3,4-epoxy-6-methylcyclohexylmethyl) adipate, etc.; epoxidized conjugated diene polymers, such as epoxidized polybutadiene, epoxidized styrene-butadiene copolymer, etc.; and heterocyclic compounds, such as triglycidyl isocyanurate, etc. These epoxy resins may be internally cross-linked by isocyanate-terminal prepolymers, or highly polymerized by using multivalent active hydrogen compounds (polyhydric phenol, polyamines, carbonyl group-containing compounds, polyphosphoric esters, etc.).

Examples of commercially available products of epoxy resins not encompassed by the aforementioned component (A) may include: DENACOL EX-313, DENACOL EX-314, DENACOL EX-321, DENACOL EX-411, DENACOL EX-421, DENACOL EX-512, DENACOL EX-521, DENACOL EX-611, DENACOL EX-612, DENACOL EX-614, DENACOL EX-622, DENACOL EX-830, DENACOL EX-832, DENACOL EX-841, DENACOL EX-861 DENACOL EX-920, DENACOL EX-931, DENACOL EX-201, DENACOL EX-711, and DENACOL EX-721 (from Nagase ChemteX Corporation); EPOLIGHT 200E, EPOLIGHT 400E, EPOLIGHT 70P, EPOLIGHT 200P, and EPOLIGHT 400P (from Kyoeisha Chemical Co., Ltd.); ADEKA RESIN EP-4088S, EP-4088L, EP-4080E, ADEKA RESIN EP-4000, ADEKA RESIN EP-4005, ADEKA RESIN EP-4100, and ADEKA RESIN EP-4901 (from c); OGSOL PG-100, OGSOL EG-200, OGSOL EG-210, and OGSOL EG-250 (from Osaka Gas Chemicals Co., Ltd.); YD Series, YDF Series, YDPN Series, and TDCN Series (from Nippon Steel & Sumikin Chemical Co., Ltd.); CELLOXIDE 2021P and CELLOXIDE 2081 (from Daicel Corporation); TECHMORE VG-3101L (from Printec Corporation); EOCN-1020, EOCN-102S, EOCN-103S, EOCN-104S, XD-1000, NC-3000, EPPN-501H, EPPN-501HY, EPPN-502H, and NC-7000L (from Nippon Kayaku Co., Ltd.); YX8800 (from Mitsubishi Chemical Corporation); and HP4032, HP4032D, and HP4700 (from DIC Corporation).

Examples of radical-polymerizable compounds different from component (A) may include: N-alkyl group-containing (meth)acrylic amide derivatives, such as N-methyl (meth) acrylic amide, N,N-dimethyl (meth)acrylic amide, N,N-diethyl(meth)acrylic amide, N-isopropyl (meth)acrylic amide, N-butyl (meth)acrylic amide, N-hexyl(meth)acrylic amide, etc.; (meth)acrylic amide derivatives, such as N-methylol (meth)acrylic amide, N-hydroxyethyl (meth) acrylic amide, N-methylol-N-propane (meth)acrylic amide, N-alkoxy group-containing (meth)acrylic amide derivatives such as N-methoxymethylacrylamide and N-ethoxymethylacrylamide, N-acryloylmorpholine, N-acryloylpiperidine, N-methacryloylpiperidine, N-acryloylpyrrolidine, etc.; unsaturated aliphatic hydrocarbons, such as ethylene, propylene, butylene, isobutylene, vinyl chloride, vinylidene chloride, vinylidene fluoride, and tetrafluoroethylene; (meth)acrylic acid, α-chloroacrylic acid, itaconic acid, maleic acid, citraconic acid, fumaric acid, hymic acid, crotonic acid, isocrotonic acid, vinylacetic acid, allylacetic acid, cinnamic acid, sorbic acid, mesaconic acid, mono[2-(meth)acryloyloxyethyl] succinate, mono[2-(meth)acryloyloxyethyl] phthalate, a mono(meth)acrylate of a polymer having a carboxy group and a hydroxyl group at both ends, such as ω-carboxypolycaprolactone mono(meth)acrylate; hydroxyethyl (meth)acrylate-maleate, hydroxypropyl (meth)acrylate-maleate, dicyclopentadiene-maleate, unsaturated polybasic acids such as a polyfunctional (meth)acrylate having one carboxyl group and two or more (meth) acryloyl groups; 2-hydroxyethyl (meth)acrylate, 2-hydroxypropyl (meth)acrylate, glycidyl (meth)acrylate, Acrylic Compounds Nos. 1 to 4 shown below, methyl (meth)acrylate, butyl (meth)acrylate, isobutyl (meth)acrylate, t-butyl (meth)acrylate, cyclohexyl (meth)acrylate, n-octyl (meth)acrylate, isooctyl (meth)acrylate, isononyl (meth)acrylate, stearyl (meth)acrylate, lauryl (meth)acrylate, methoxyethyl (meth)acrylate, dimethylaminomethyl (meth)acrylate, dimethylaminoethyl (meth)acrylate, aminopropyl (meth)acrylate, dimethylaminopropyl (meth)acrylate, ethoxyethyl (meth)acrylate, poly(ethoxy)ethyl (meth) acrylate, butoxyethoxyethyl (meth)acrylate, ethylhexyl (meth)acrylate, phenoxyethyl (meth)acrylate, tetrahydrofuryl (meth)acrylate, vinyl (meth)acrylate, allyl (meth)acrylate, benzyl (meth)acrylate; esters between an unsaturated monobasic acid and a polyhydric alcohol or polyhydric phenol, such as ethylene glycol di(meth)acrylate, diethylene glycol di(meth)acrylate, triethylene glycol di(meth)acrylate, polyethylene glycol di(meth)acrylate, propylene glycol di(meth)acrylate, 1,4-butanediol di(meth)acrylate, 1,6-hexanediol di(meth)acrylate, trimethylolethane tri(meth) acrylate, trimethylolpropane tri(meth)acrylate, dipentaerythritol hexa(meth)acrylate, dipentaerythritol penta(meth) acrylate, pentaerythritol tetra(meth)acrylate, pentaerythritol tri(meth)acrylate, tricyclodecanedimethylol di(meth)acrylate, tri[(meth)acryloylethyl] isocyanurate, and polyester (meth)acrylate oligomers; metal salts of unsaturated polybasic acids, such as zinc (meth)acrylate and magnesium (meth)acrylate; unsaturated polybasic acid anhydrides, such as maleic anhydride, itaconic anhydride, citraconic anhydride, methyltetrahydrophthalic anhydride, tetrahydrophthalic anhydride, trialkyltetrahydrophthalic anhydrides, 5-(2,5-dioxotetrahydrofuryl)-3-methyl-3-cyclohexene-1,2-dicarboxylic acid anhydride, trialkyltetrahydrophthalic anhydride-maleic anhydride adducts, dodecenylsuccinic anhydride, and methylhymic anhydride; unsaturated aldehydes, such as acrolein; unsaturated nitriles, such as (meth) acrylonitrile, α-chloroacrylonitrile, vinylidene cyanide, and allyl cyanide; unsaturated aromatic compounds, such as styrene, 4-methylstyrene, 4-ethylstyrene, 4-methoxystyrene, 4-hydroxystyrene, 4-chlorostyrene, divinylbenzene, vinyltoluene, vinylbenzoic acid, vinylphenol, vinylsulfonic acid, 4-vinylbenzenesulfonic acid, vinylbenzyl methyl ether, and vinylbenzyl glycidyl ether; unsaturated ketones, such as methyl vinyl ketone; unsaturated amine compounds, such as vinylamine, allylamine, N-vinylpyrrolidone, and vinylpiperidine; vinyl alcohols, such as allyl alcohol and crotyl alcohol; vinyl ethers, such as vinyl methyl ether, vinyl ethyl ether, n-butyl vinyl ether, isobutyl vinyl ether, and allyl glycidyl ether; unsaturated imides, such as maleimide, N-phenylmaleimide, and N-cyclohexylmaleimide; indenes, such as indene and 1-methylindene; aliphatic conjugated dienes, such as 1,3-butadiene, isoprene, and chloroprene; macromonomers having a mono(meth)acryloyl group at the end of the polymeric molecular chain thereof, such as polystyrene, polymethyl (meth)acrylate, poly-n-butyl (meth)acrylate, and polysiloxanes; vinyl chloride, vinylidene chloride, divinyl succinate, diallyl phthalate, triallyl phosphate, triallyl isocyanurate, vinyl thioether, vinylimidazole, vinyloxazoline, vinylcarbazole, vinylpyrrolidone, vinylpyridine, vinylurethane compounds formed between a hydroxyl-containing vinyl monomer and a polyisocyanate compound, and vinylepoxy compounds formed between a hydroxyl-containing vinyl monomer and a polyepoxy compound.

Examples of commercially available products of radical-polymerizable compounds not encompassed by the aforementioned component (A) may include: FFM-2, FFM-3, FFM-4, and FFM-5 (from Fujifilm Corporation); KAYARAD DPHA, DPEA-12, PEG400DA, THE-330, RP-1040, NPGDA, PET30, and R-684 (from Nippon Kayaku Co., Ltd.); Aronix M-215 and M-350 (from Toagosei Co., Ltd.); NK Ester A-DPH, A-TMPT, A-DCP, A-HD-N, TMPT, DCP, NPG, and HD-N (from Shin-Nakamura Chemical Co, Ltd.); and SPC-1000 and SPC-3000 (from Showa Denko K.K.).

The curable resin composition of the present invention contains (B) a thiol-based curing agent. The thiol-based curing agent serving as component (B) is used for curing component (A) by irradiation of light and by heating. In the curable resin composition of the present invention, it is preferable that that (B) the thiol-based curing agent is in liquid form at 25° C. from the viewpoint of obtaining a low-viscosity curable resin composition.

Examples of (B) the thiol-based curing agent may include polythiol compounds. Examples of polythiol compounds may include pentaerythritol tetrakis(3-mercaptopropionate), pentaerythritol tetrakis(thioglycolate), dipentaerythritol hexakis (3-mercaptopropionate), dipentaerythritol hexakis (3-mercaptobutyrate), 1,3,4,6-tetrakis(2-mercaptoethyl)-1, 3,4,6-tetraazaoctahydropentalene-2,5-dione, 1,3,5-tris(3-mercaptopropyl)-1,3,5-triazine-2,4,6 (1H,3H,5H)-trione, 4-mercaptomethyl-1,8-dimercapto-3,6-dithiaoctane, 4,8-, 4,7- or 5,7-dimercaptomethyl-1,11-dimercapto-3,6,9-trithiaundecane, 1,3,4,6-tetrakis(2-mercaptoethyl)glycoluril, 1,2, 3-tris(mercaptomethylthio)propane, 1,2,3-tris(2-mercaptoethylthio)propane, 1,2,3-tris(3-mercaptopropylthio) propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3, 6,9-trithiaundecane, 4,8-dimercaptomethyl-1,11-dimercapto-3,6,9-trithiaundecane, tetrakis (mercaptomethylthiomethyl)methane, tetrakis(2-mercaptoethylthiomethyl)methane, tetrakis(3-mercaptopropylthiomethyl)methane, 1,1,3,3-tetrakis (mercaptomethylthio)propane, 1,1,2,2-tetrakis (mercaptomethylthio) ethane, 4,6-bis(mercaptomethylthio)-1,3-dithiane, 1,1,5,5-tetrakis(mercaptomethylthio)-3-thiapentane, 1,1,6,6-tetrakis(mercaptomethylthio)-3,4-dithiahexane, 2,2-bis(mercaptomethylthio) ethane thiol, 3-mercaptomethylthio-1,7-dimercapto-2,6-dithiaheptane, 3,6-bis(mercaptomethylthio)-1,9-dimercapto-2,5,8-trithianonane, 3-mercaptomethylthio-1,6-dimercapto-2,5-dithiahexane, 1,1,9,9-tetrakis(mercaptomethylthio)-5-(3,3-bis (mercaptomethylthio)-1-thiapropyl) 3,7-dithianonane, tris (2,2-bis(mercaptomethylthio)ethyl)methane, tris(4,4-bis (mercaptomethylthio)-2-thiabutyl)methane, tetrakis(2,2-bis (mercaptomethylthio)ethyl)methane, tetrakis(4,4-bis (mercaptomethylthio)-2-thiabutyl)methane, 3,5,9,11-tetrakis(mercaptomethylthio)-1,13-dimercapto-2,6,8,12-tetrathiatridecane, 3,5,9,11,15,17-hexakis (mercaptomethylthio)-1,19-dimercapto-2,6,8,12,14,18-hexathianonadecane, 9-(2,2-bis(mercaptomethylthio)ethyl)-3,5, 13,15-tetrakis(mercaptomethylthio)-1,17-dimercapto-2,6,8, 10,12,16-hexathiaheptadecane, 3,4,8,9-tetrakis (mercaptomethylthio)-1,11-dimercapto-2,5,7,10-tetrathiaundecane, 3,4,8,9,13,14-hexakis (mercaptomethylthio)-1,16-dimercapto-2,5,7,10,12,15-hexathiahexadecane, 8-[bis(mercaptomethylthio)methyl]-3,4, 12,13-tetrakis(mercaptomethylthio)-1,15-dimercapto-2,5,7, 9,11,14-hexathiapentadecane, 4,6-bis[3,5-bis (mercaptomethylthio)-7-mercapto-2,6-dithiaheptylthio]-1, 3-dithiane, 4-[3,5-bis(mercaptomethylthio)-7-mercapto-2,6-dithiaheptylthio]-6-mercaptomethylthio-1,3-dithiane, 1,1-bis[4-(6-mercaptomethylthio)-1,3-dithianylthio]-1,3-bis (mercaptomethylthio)propane, 1-[4-(6-mercaptomethylthio)-1,3-dithianylthio]-3-[2,2-bis (mercaptomethylthio)ethyl]-7,9-bis(mercaptomethylthio)-2, 4,6,10-tetrathiaundecane, 1,5-bis[4-(6-mercaptomethylthio)-1,3-dithianylthio]-3-[2-(1,3-dithietanyl)]methyl-2,4-dithiapentane, 3-[2-(1,3-dithietanyl)]methyl-7,9-bis(mercaptomethylthio)-1,11-dimercapto-2,4,6,10-tetrathiaundecane, 9-[2-(1,3-dithietanyl)]methyl-3,5,13,15-tetrakis (mercaptomethylthio)-1,17-dimercapto-2,6,8,10,12,16-hexathiaheptadecane, 3-[2-(1,3-dithietanyl)]methyl-7,9,13, 15-tetrakis(mercaptomethylthio)-1,17-dimercapto-2,4,6,10, 12,16-hexathiaheptadecane, 3,7-bis[2-(1,3-dithietanyl)] methyl-1,9-dimercapto-2,4,6,8-tetrathianonane, 4,6-bis {3-[2-(1,3-dithietanyl)]methyl-5-mercapto-2,4-dithiapentylthio}-1,3-dithiane, 4,6-bis[4-(6-mercaptomethylthio)-1,3-dithianylthio]-6-[4-(6-mercaptomethylthio)-1,3-dithianylthio]-1,3-dithiane, 4-[3,4, 8,9-tetrakis(mercaptomethylthio)-11-mercapto-2,5,7,10-tetrathiaundecyl]-5-mercaptomethylthio-1,3-dithiolane, 4,5-bis[3,4-bis(mercaptomethylthio)-6-mercapto-2,5-dithiahexylthio]-1,3-dithiolane, 4-[3,4-bis (mercaptomethylthio)-6-mercapto-2,5-dithiahexylthio]-5-mercaptomethylthio-1,3-dithiolane, 4-[3-bis (mercaptomethylthio)methyl-5,6-bis(mercaptomethylthio)-8-mercapto-2,4,7-trithiaoctyl]-5-mercaptomethylthio-1,3-dithiolane, 2-{bis[3,4-bis(mercaptomethylthio)-6-mercapto-2,5-dithiahexylthio]methyl}-1,3-dithietane, 2-[3,4-bis (mercaptomethylthio)-6-mercapto-2,5-dithiahexylthio] mercaptomethylthiomethyl-1,3-dithietane, 2-[3,4,8,9-tetrakis(mercaptomethylthio)-11-mercapto-2,5,7,10-tetrathiaundecylthio]mercaptomethylthiomethyl-1,3-dithietane, 2-[3-bis(mercaptomethylthio)methyl-5,6-bis (mercaptomethylthio)-8-mercapto-2,4,7-trithiaoctyl] mercaptomethylthiomethyl-1,3-dithietane, 4,5-bis {1-[2-(1, 3-dithietanyl)]-3-mercapto-2-thiapropylthio}-1,3-dithiolane, 4-{1-[2-(1,3-dithietanyl)]-3-mercapto-2-thiapropylthio}-5-[1,2-bis(mercaptomethylthio)-4-mercapto-3-thiabutylthio]-1,3-dithiolane, 2-{bis[4-(5-mercaptomethylthio-1,3-dithiolanyl)thio]methyl}-1,3-dithietane, 4-[4-(5-mercaptomethylthio-1,3-dithiolanyl) thio]-5-{1-[2-(1,3-dithietanyl)]-3-mercapto-2-thiapropylthio}-1,3-dithiolane, etc. In the present invention, one type of the aforementioned polythiol compound may be used singly, or two or more types may be used in combination.

Examples of commercially available products of polythiol compounds may include: TS-G from Shikoku Chemicals Corporation; DPMP and PEMP from SC Organic Chemical Co., Ltd.; and PETG from Yodo Kagaku Co., Ltd.

In the present invention, from the viewpoint of even better curability of the curable composition, it is preferable to use a polythiol compound which is tetravalent or higher. The upper limit of the valence number of the polythiol compound is not particularly limited, but is preferably hexavalent or lower.

In the curable composition of the present invention, it is preferable to use, as (B) the thiol-based curing agent, a polythiol ether of a polyol, such as pentaerythritol tetrakis (3-mercaptopropionate), pentaerythritol tetrakis(thioglycolate), dipentaerythritol hexakis (3-mercaptopropionate), dipentaerythritol hexakis (3-mercaptobutyrate), etc., from the viewpoint that the curable composition will have even better curability. From the same viewpoint, it is preferable to use, as (B) the thiol-based curing agent, a polythiol having a heterocycle containing at least one nitrogen in a ring thereof, such as 1,3,4,6-tetrakis(2-mercaptoethyl)glycoluril, 1,3,5-tris(3-mercaptopropyl)-1,3,5-triazine-2,4,6 (1H,3H, 5H)-trione, etc.

The content of (B) the thiol-based curing agent in the curable composition of the present invention may be an amount sufficient for providing thiol groups capable of reacting with the allyl group and epoxy group in component (A). From the viewpoint of obtaining a satisfactory cured product, the lower limit of the content of (B) the thiol-based curing agent in the curable composition of the present invention is an amount that is preferably 0.5 equivalents or greater, more preferably 0.7 equivalents or greater, even more preferably 0.8 equivalents or greater, per 1 equivalent of the allyl group in the component (A), because component (B) can react with both the allyl group and epoxy group in component (A). Further, the upper limit is an amount that is preferably 3.0 equivalents or less, more preferably 1.5 equivalents or less, even more preferably 1.2 equivalents or less, particularly preferably 1.0 equivalent or less, per 1 equivalent of the allyl group in the component (A). From the same viewpoint, the content of (B) the thiol-based curing agent in the curable composition of the present invention is an amount that is preferably from 0.5 to 3.0 equivalents, more preferably from 0.7 to 2.7 equivalents, even more preferably from 0.8 to 2.5 equivalents, per 1 equivalent of the allyl group in the component (A).

The curable resin composition of the present invention contains (C) a photoradical initiator. For the photoradical initiator, which is component (C), it is possible to use any conventionally known compound without particularly limitation, so long as it is a compound that produces radicals by irradiation of light. Examples of (C) the photoradical initiator may preferably include acetophenone-based compounds, benzil-based compounds, benzophenone-based compounds, thioxanthone-based compounds, oxime ester-based compounds, etc. In the curable resin composition of the present invention, it is preferable to use an acetophenone-based compound from the viewpoint of obtaining good photocurability.

Examples of acetophenone-based compounds may include diethoxyacetophenone, 2-hydroxy-2-methyl-1-phenylpropan-1-one, 4'-isopropyl-2-hydroxy-2-methylpropiophenone, 2-hydroxymethyl-2-methylpropiophenone, 2,2-dimethoxy-1,2-diphenylethan-1-one, p-dimethylaminoacetophenone, p-tertiary-butyldichloroacetophenone, p-tertiary-butyltrichloroacetophenone, p-azide benzalacetophenone, 1-hydroxycyclohexyl phenyl ketone, 2-methyl-1-[4-(methylthio)phenyl]-2-morpholino-1-propanone, 2-benzyl-2-dimethylamino-1-(4-morpholinophenyl)-1-butanone, benzoin, benzoin methyl ether, benzoin ethyl ether, benzoin isopropyl ether, benzoin-n-butyl ether, benzoin isobutyl ether, and 1-[4-(2-hydroxyethoxy)-phenyl]-2-hydroxy-2-methyl-1-propan-1-one, etc. In the curable resin composition of the present invention, from the viewpoint of obtaining good photocurability, it is preferable to use an aminoacetophenone-based compound such as p-dimethylaminoacetophenone, 2-methyl-1-[4-(methylthio) phenyl]-2-morpholino-1-propanone, 2-benzyl-2-dimethylamino-1-(4-morpholinophenyl)-1-butanone, etc.

An example of the benzil-based compound may include benzil.

Examples of benzophenone-based compounds may include benzophenone, methyl o-benzoylbenzoate, Michler's ketone, 4,4'-bisdiethylaminobenzophenone, 4,4'-dichlorobenzophenone, 4-benzoyl-4'-methyldiphenyl sulfide, etc.

Examples of thioxanthone-based compounds may include thioxanthone, 2-methylthioxanthone, 2-ethylthioxanthone, 2-chlorothioxanthone, 2-isopropylthioxanthone, 2,4-diethylthioxanthone, etc.

In the present invention, oxime ester-based compounds refer to compounds having an oxime ester group. These compounds have good sensitivity among the aforementioned photoradical polymerization initiators, and are thus preferably usable in the curable composition of the present invention.

Preferred examples of oxime ester-based compounds may include compounds having a carbazole skeleton, compounds having a diphenyl sulfide skeleton, or compounds having a fluorene skeleton, because such compounds have particularly high sensitivity.

In the curable resin composition of the present invention, photoradical polymerization initiator(s) other than acetophenone-based compounds, benzil-based compound, benzophenone-based compounds, thioxanthone-based compounds and oxime ester-based compounds may be used as (C) the photoradical initiator. Examples of other photoradical polymerization initiators may include phosphine oxide-based compounds such as 2,4,6-trimethylbenzoyldiphenylphosphine oxide, titanocene-based compounds such as bis(cyclopentadienyl)-bis[2,6-difluoro-3-(pyrr-1-yl)] titanium, etc.

In the present invention, one type of the aforementioned photoradical initiator may be used singly, or two or more types may be used in combination.

In the curable resin composition of the present invention, commercially available photoradical initiators may be used for (C) the photoradical initiator. Examples of commercially available photoradical initiators may include: ADEKA OPTOMER N-1414, N-1717, N-1919, ADEKA ARKLS NCI-831, and NCI-930 (from Adeka Corporation); IRGACURE184, IRGACURE369, IRGACURE651, IRGACURE907, IRGACURE OXE 01, IRGACURE OXE 02, and IRGACURE784 (from BASF); and TR-PBG-304, TR-PBG-305, TR-PBG-309, and TR-PBG-314 (from Tronly).

The content of (C) the photoradical initiator in the curable resin composition of the present invention may be an amount sufficient for starting a reaction between the allyl group in component (A) and the thiol group in component (B). From the viewpoint of obtaining good photocurability, it is preferable that the content is from 0.1 to 10 parts by mass, more preferably from 1 to 10 parts by mass, with respect to 100 parts by mass in total of component (A) and component (B). From the same viewpoint, it is preferable that the content of component (C), with respect to 100 parts by mass in total of component (A) and component (B), is 0.1 parts by mass or greater, more preferably 0.3 parts by mass or greater, even more preferably 0.5 parts by mass or greater, further preferably 0.7 parts by mass or greater, and preferably 10 parts by mass or less, more preferably 5 parts by mass or less, even more preferably 2.5 parts by mass or less, further preferably 2.0 parts by mass or less, and preferably from 0.1 to 10 parts by mass, more preferably from 0.3 to 5 parts by mass, even more preferably from 0.5 to 2.5 parts by mass, further preferably from 0.7 to 2.0 parts by mass, most preferably from 0.9 to 1.4 parts by mass.

The curable resin composition of the present invention contains (D) at least one type of compound selected from the group consisting of thermally latent curing agents and curing catalysts. In the present invention, a thermally latent curing agent refers to a curing agent that does not cause the curable resin composition to cure at temperatures below or equal to 40° C., but causes the curable resin composition to cure by heating. The thermally latent curing agent is preferably a compound that causes the curable resin composition to cure by heating at 70° C. or higher.

Examples of the thermally latent curing agent, which is component (D), may include: dibasic acid dihydrazides, such as oxalic acid dihydrazide, malonic acid dihydrazide, succinic acid dihydrazide, glutaric acid dihydrazide, adipic acid dihydrazide, suberic acid dihydrazide, azelaic acid dihydrazide, sebacic acid dihydrazide, phthalic acid dihydrazide, etc.; guanamines, such as benzoguanamine, acetoguanamine, etc.; dicyandiamide; melamine; and modified amine-based curing agents, such as dehydration condensates of amines and carboxylic acids, adducts of amines and epoxies, adducts of amines and isocyanates, Michael adducts of amines, Mannich reaction products of amines, condensates of amines and urea, and condensates of amines and ketones. In the curable resin composition of the present invention, it is preferable to use a modified amine-based curing agent as the thermally latent curing agent which is component (D), because it can also function as a curing catalyst of component (A) and component (B). In the curable resin composition of the present invention, one type of the aforementioned thermally latent curing agent may be used singly, or two or more types of thermally latent curing agents may be used in combination.

The modified amine-based curing agent may be a polyepoxy and/or isocyanate adduct of an amine compound containing at least one active hydrogen, or an agent obtained by combining the same with a phenolic resin.

Examples of the amine compound containing at least one active hydrogen may include: alkylene diamines, such as ethylenediamine, 1,2-diaminopropane, 1,3-diaminopropane, 1,3-diaminobutane, 1,4-diaminobutane, hexamethylenediamine, etc.; polyalkylpolyamines, such as diethylenetriamine, triethylenetriamine, tetraethylenepentamine, etc.; alicyclic polyamines, such as 1,4-diaminocyclohexane, 1,3-diaminocyclohexane, 1,3-diaminomethylcyclohexane, 1,2-diaminocyclohexane, 1,4-diamino-3,6-diethylcyclohexane, 4,4'-diaminodicyclohexylmethane, 1,3-bis(aminomethyl)cyclohexane, 1,4-bis(aminomethyl)cyclohexane, 4,4'-diaminodicyclohexylpropane, bis(4-aminocyclohexyl)sulfone, 4,4'-diaminodicyclohexyl ether, 2,2'-dimethyl-4,4'-diaminodicyclohexylmethane, isophorone diamine, norbornene diamine, etc.; aromatic polyamines, such as m-xylylenediamine, diaminodiphenylmethane, diaminodiphenylsulfone, diethyltoluenediamine, 1-methyl-3,5-diethyl-2,4-diaminobenzene, 1-methyl-3,5-diethyl-2,6-diaminobenzene, 1,3,5-triethyl-2,6-diaminobenzene, 3,3'-diethyl-4,4'-diaminodiphenylmethane, 3,5,3',5'-tetramethyl-4,4'-diaminodiphenylmethane, etc.; guanamines, such as benzoguanamine, acetoguanamine, etc.; imidazoles, such as 2-methylimidazole, 2-ethyl-4-methylimidazole, 2-isopropylimidazole, 2-undecylimidazole, 2-heptadecylimidazole, 2-phenylimidazole, 2-phenyl-4-methylimidazole, 2-aminopropylimidazole, etc.; dihydrazides, such as oxalic acid dihydrazide, malonic acid dihydrazide, succinic acid dihydrazide, glutaric acid dihydrazide, adipic acid dihydrazide, suberic acid dihydrazide, azelaic acid dihydrazide, sebacic acid dihydrazide, phthalic acid dihydrazide, etc.; N,N-dimethylaminoethylamine, N,N-diethylaminoethylamine, N,N-diisopropylaminoethylamine, N,N-diallylaminoethylamine, N,N-benzylmethylaminoethylamine, N,N-dibenzylaminoethylamine, N,N-cyclohexylmethylaminoethylamine, N,N-dicyclohexylaminoethylamine, N-(2-aminoethyl) pyrrolidine, N-(2-aminoethyl) piperidine, N-(2-aminoethyl) morpholine, N-(2-aminoethyl) piperazine, N-(2-aminoethyl)-N'-methylpiperazine, N,N-dimethylaminopropylamine, N,N-diethylaminopropylamine, N,N-diisopropylaminopropylamine, N,N-diallylaminopropylamine, N,N-benzylmethylaminopropylamine, N,N-dibenzylaminopropylamine, N,N-cyclohexylmethylaminopropylamine, N,N-dicyclohexylaminopropylamine, N-(3-aminopropyl) pyrrolidine, N-(3-aminopropyl) piperidine, N-(3-aminopropyl) morpholine, N-(3-aminopropyl) piperazine, N-(3-aminopropyl)-N'-methylpiperidine, 4-(N,N-dimethylamino)benzylamine, 4-(N,N-diethylamino)benzylamine, 4-(N,N-diisopropylamino)benzylamine, N,N-dimethylisophoronediamine, N,N-dimethylbisaminocyclohexane, N,N,N'-trimethylethylenediamine, N'-ethyl-N,N-dimethylethylenediamine, N,N,N'-trimethylethylenediamine, N'-ethyl-N,N-dimethylpropanediamine, N'-ethyl-N,N-dibenzylaminopropylamine; N,N-(bisaminopropyl)-N-methylamine, N,N-bisaminopropylethylamine, N,N-bisaminopropylpropylamine, N,N-bisaminopropylbutylamine, N,N-bisaminopropylpentylamine, N,N-bisaminopropylhexylamine, N,N-bisaminopropyl-2-ethylhexylamine, N,N-bisaminopropylcyclohexylamine, N,N-bisaminopropylbenzylamine, N,N-bisaminopropylallylamine, bis[3-(N,N-dimethylaminopropyl)]amine, bis[3-(N,N-diethylaminopropyl)]amine, bis[3-(N,N-diisopropylaminopropyl)]amine, bis[3-(N,N-dibutylaminopropyl)]amine, etc.

Examples of epoxy compounds may include: polyglycidyl ether compounds of mononuclear polyhydric phenol compounds such as hydroquinone, resorcin, pyrocatechol, phloroglucinol, etc.; polyglycidyl ether compounds of polynuclear polyhydric phenol compounds such as dihydroxynaphthalene, biphenol, methylene bisphenol (bisphenol F), methylene bis(o-cresol), ethylidene bisphenol, isopropylidene bisphenol (bisphenol A), isopropylidene bis(o-cresol), tetrabromobisphenol A, 1,3-bis(4-hydroxycumylbenzene), 1,4-bis(4-hydroxycumylbenzene), 1,1,3-tris(4-hydroxyphenyl) butane, 1,1,2,2-tetra(4-hydroxyphenyl) ethane, thiobisphenol, sulfonylbisphenol, oxybisphenol, phenol novolac, ortho-cresol novolac, ethylphenol novolac, butylphenol novolac, octylphenol novolac, resorcin novolac, terpene phenol, etc.; polyglycidyl ethers of polyols such as ethylene glycol, propylene glycol, butylene glycol, hexanediol, polyglycol, thiodiglycol, glycerin, trimethylolpropane, pentaerythritol, sorbitol, bisphenol A-alkylene oxide adduct, etc.; glycidyl esters of aliphatic, aromatic or alicyclic polybasic acids such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesic acid, pyromellitic acid, tetrahydrophthalic acid, hexahydrophthalic acid, endomethylene tetrahydrophthalic acid, etc., and homopolymers or copolymers of glycidyl methacrylate; epoxy compounds having a glycidylamino group, such as N,N-diglycidylaniline, bis(4-(N-methyl-N-glycidylamino)phenyl)methane, diglycidyl ortho-toluidine, etc.; epoxidized products of cyclic olefin compounds, such as vinylcyclohexene diepoxide, dicyclopentadiene diepoxide, 3,4-epoxycyclohexylmethyl-3,4-epoxycyclohexane carboxylate, 3,4-epoxy-6-methylcyclohexylmethyl-6-methylcyclohexane carboxylate, bis(3,4-epoxy-6-methylcyclohexylmethyl) adipate, etc.; epoxidized conjugated diene polymers, such as epoxidized polybutadiene, epoxidized styrene-butadiene copolymer, etc.; and heterocyclic compounds, such as triglycidyl isocyanurate, etc.

Examples of polyisocyanate compounds may include: aromatic diisocyanates, such as 2,4-tolylene diisocyanate, 2,6-tolylene diisocyanate, diphenylmethane-4,4'-diisocyanate, phenylene diisocyanate, xylylene diisocyanate, tetramethylxylylene diisocyanate, 1,5-naphthylene diisocyanate, 1,5-tetrahydronaphthalene diisocyanate, 3,3'-dimethyldiphenyl-4,4'-diisocyanate, dianisidine diisocyanate, tetramethylxylylene diisocyanate, etc.; alicyclic diisocyanates, such s isophorone diisocyanate, dicyclohexylmethane-4,4'-diisocyanate, trans-1,4-cyclohexyl diisocyanate, norbornene diisocyanate, etc.; aliphatic diisocyanates, such as tetramethylene diisocyanate, 1,6-hexamethylene diisocyanate, 2,2,4 and/or (2,4,4)-trimethylhexamethylene diisocyanate, lycine diisocyanate, etc.; isocyanurate trimers, biuret trimers, trimethylolpropane adducts, etc., of the aforementioned diisocyanates; triphenylmethane triisocyanate, 1-methylbenzol-2,4,6-triisocyanate, dimethyltriphenylmethane tetraisocyanate, etc.

Further, the aforementioned isocyanate compounds may be, for example, carbodiimide-modified, isocyanurate-modified, or biuret-modified, or may take the form of blocked isocyanate which is blocked by a variety of blocking agents.

Examples of phenolic resins may include polyhydric phenol compounds, such as phenol novolac resin, cresol novolac resin, aromatic hydrocarbon formaldehyde resin-modified phenolic resin, dicyclopentadiene-phenol addition-type resin, phenol aralkylresin (Xylok resin), naphthol aralkyl resin, trisphenylol methane resin, tetraphenylol ethane resin, naphthol novolac resin, naphthol-phenol co-condensed novolac resin, naphthol-cresol co-condensed novolac resin, biphenyl-modified phenolic resin (a polyhydric phenol compound wherein phenol nuclei are linked by a bismethylene group), biphenyl-modified naphthol resin (a polyhydric naphthol compound wherein phenol nuclei are linked by a bismethylene group), aminotriazine-modified phenolic resin (a compound containing a phenol skeleton, a triazine ring and a primary amino group in its molecular structure), and alkoxy group-containing aromatic ring-modified novolac resin (a polyhydric phenol compound wherein a phenol nucleus and an alkoxy group-containing aromatic ring are linked by formaldehyde).

Commercially available products can be used for the aforementioned modified amine-based curing agent. Examples of commercially available products of the aforementioned modified amine-based curing agent may include Adeka Hardener EH-3636S (from Adeka Corporation; dicyandiamide-type latent curing agent), Adeka Hardener EH-4351S (from Adeka Corporation; dicyandiamide-type latent curing agent), Adeka Hardener EH-5011S (from Adeka Corporation; imidazole-type latent curing agent), Adeka Hardener EH-5046S (from Adeka Corporation; imidazole-type latent curing agent), Adeka Hardener EH-4357S (from Adeka Corporation; polyamine-type latent curing agent), Adeka Hardener EH-5057P (from Adeka Corporation; polyamine-type latent curing agent), Adeka Hardener EH-5057PK (from Adeka Corporation; polyamine-type latent curing agent), Adeka Hardener EH-4370S (from Adeka Corporation; polyamine-type latent curing agent), Ajicure PN-23 (from Ajinomoto Fine-Techno Co., Inc.; amine adduct-based latent curing agent), Ajicure PN-40 (from Ajinomoto Fine-Techno Co., Inc.; amine adduct-based latent curing agent), Ajicure VDH (from Ajinomoto Fine-Techno Co., Inc.; hydrazide-based latent curing agent), Fujicure FXR-1020 (from T&K TOKA Corporation; latent curing agent), etc.

Examples of the curing catalyst, which is component (D) in the present invention, may include: phosphine compounds, such as triphenylphosphine, etc.; phosphonium salts, such as tetraphenylphosphonium bromide, etc.; imidazoles, such as 2-methylimidazole, 2-phenylimidazole, 2-undecylimidazole, 1-cyanoethyl-2-methylimidazole, 1-{3-[(3-trimethoxysilyl) propylaminocarbonylamino]propyl}-2-methylimidazole, 1-[3-trimethoxysilylpropylaminomethyl]-4-methylimidazole, 1-[3-(trimethoxysilylpropyl)]imidazole, 1-[3-(trimethoxysilylpropyl)]imidazole, etc.; imidazole salts, such as salts between the aforementioned imidazoles and trimellitic acid, isocyanuric acid, boron, amines, as etc.; such benzyldimethylamine, 2,4,6-tris (dimethylaminomethyl)phenol, etc.; quaternary ammonium salts, such as trimethylammonium chloride, etc.; ureas, such as 3-(p-chlorophenyl)-1,1-dimethylurea, 3-(3,4-dichlorophenyl)-1,1-dimethylurea, 3-phenyl-1,1-dimethylurea, isophorone diisocyanate-dimethylurea, tolylene diisocyanate-dimethylurea, etc.; and complex compounds between boron trifluoride and amines, ether compounds, etc. One type of the aforementioned curing accelerator may be used singly, or two or more types may be used in combination.

The content of (D) the thermally latent curing agent and curing catalyst in the curable resin composition of the present invention is from 0.01 to 55 parts by mass, more preferably from 0.01 to 20 parts by mass, in total of the thermally latent curing agent and curing catalyst with respect to 100 parts by mass of component (A), because the curable resin composition will have good heat-curability and the obtained cured product will have good physical properties.

The curable resin composition of the present invention cures by being irradiated with light and by being heated. Curing by irradiation of light occurs due to reaction between the allyl group in component (A) and the thiol group in component (B) in the presence of component (C), i.e., the photoradical initiator. It is thought that curing by heating occurs either due to reaction between the epoxy group in component (A) and the thiol group in component (B) in the presence of component (D), i.e., the thermally latent curing agent and/or curing catalyst, or due to reaction between the epoxy group in component (A) and component (D), i.e., the thermally latent curing agent.

In the present invention, components other than the aforementioned components (A), (B), (C) and (D) may be included as necessary. Examples of other components may include: aminosilane compounds, such as 3-aminopropyltrimethoxysilane, 3-aminopropyltriethoxysilane, N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, N-(2-aminoethyl)-3-aminopropylmethyldiethoxysilane, N-(2-aminoethyl)-8-aminooctyltrimethoxysilane, N-phenyl-3-aminopropyltrimethoxysilane, 3-triethoxysilyl-N-(1,3-dimethylbutylidene) propylamine, etc.; mercaptosilane compounds, such as 3-mercaptopropyltrimethoxysilane, etc.; silane coupling agents such as epoxy silane compounds, e.g., 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, etc.; reactive or non-reactive diluents (plasticizers), such as monoglycidyl ethers, dioctyl phthalate, dibutyl phthalate, benzyl alcohol, coal tar, etc.; fillers or pigments, such as glass fiber, carbon fiber, cellulose, silica sand, cement, kaoline, clay, aluminum hydroxide, bentonite, talc, silica, powdered silica, titanium dioxide, carbon black, graphite, iron oxide, bituminous substances, etc.; lubricants, such as candelilla wax, carnauba wax, Japan wax, Chinese wax, beeswax, lanolin, spermaceti wax, montan wax, petroleum wax, fatty acid wax, fatty acid ester, fatty acid ether, aromatic ester, and aromatic ether; thickening agents; thixotropic agents; antioxidants; light stabilizers; UV absorbers; fire retardants; antifoaming agents; rust preventives; colloidal silica, and colloidal alumina. Further, self-adhesive resins, such as xylene resin and petroleum resin, may be used with the above components.

The curable resin composition of the present invention is usable in a wide variety of applications, such as paint, adhesives, tackifiers, coating agents, fiber sizing agents, construction materials, electronic components, etc. Particularly, because of its excellent curability by light and heat, the composition is usable in applications allowing dual curing. More specifically, the composition can suitably be used in such applications as liquid encapsulants, liquid adhesives, liquid crystal sealants, adhesives for camera modules, etc.

Next, a method for curing the curable resin composition of the present invention will be described.

The curing method of the present invention involves: a pre-curing step of pre-curing the aforementioned curable resin composition by irradiating the curable resin composition with light; and a curing step of curing the pre-cured curable resin composition by heating the pre-cured curable resin composition. In the present invention, pre-curing refers to a state wherein the curable resin composition has not completely cured, but has lost its tack.

In the pre-curing step, the curable resin composition may be irradiated with rays such as visible rays, infrared rays, UV rays, X-rays, etc., to pre-cure the curable resin composition. From the viewpoint of obtaining satisfactory cured products (pre-cured products), it is preferable to use rays having wavelengths from 150 to 500 nm, more preferably from 250 to 450 nm, even more preferably from 300 to 400 nm. Examples of light sources may include low pressure mercury lamps (e.g., bactericidal lamps, fluorescent chemical lamps, and black lights), high pressure discharge lamps (e.g., high pressure mercury lamps and metal halide lamps), and short arc discharge lamps (e.g., ultrahigh pressure mercury lamps, xenon lamps, and mercury xenon lamps). In the present invention, it is preferable to use an ultrahigh pressure mercury lamp. The curable composition may be irradiated with rays of light as emitted from a light source, or may be irradiated with rays of light of a specific wavelength (or within a specific wavelength range) selected through a filter. Preferably, the irradiation energy density is from 2 to 5000 mJ/cm$^2$, more preferably from 10 to 3500 mJ/cm$^2$, even more preferably from 100 to 3500 mJ/cm$^2$. Preferably, the intensity of illumination is from 0.1 to 5000 mW/cm$^2$, more preferably from 1 to 2000 mW/cm$^2$. The temperature during irradiation of light may be determined so that the curable resin composition will exhibit a liquid crystal phase; the irradiation temperature may preferably be 100° C. or lower, more preferably room temperature. Temperatures above 100° C. may give rise to thermal polymerization, which may result in poor orientation. "Room temperature" refers to ambient temperature in a state where no heating is performed intentionally.

There is no particular limitation to the heating conditions in the curing step of curing the pre-cured curable resin composition by heating, and various known conditions may be adopted. To cure the curable resin composition reliably and to inhibit thermal damage to components caused by heating, it is preferable that heating is performed at a temperature of from 50 to 200° C., more preferably from 60 to 150° C., for 30 to 120 minutes, more preferably for 50 to 100 minutes. For example, a heat circulation-type oven may be used as the heating means.

EXAMPLES

The present invention will be described in further detail by Examples. The present invention, however, is not limited to the following Examples.

Production Example 1: Method for Producing Epoxy Resin [EP-1]

A flask equipped with a reflux device, a stirring device, and a dropping device was charged with 140 g (1.0 mol) of allylphenol novolac [m1=0.05] and 648 g (7.0 mol) of epichlorohydrin, whereas 83.3 g (1.0 mol) of sodium hydroxide, as a 48% aqueous solution, was placed in the dropping device. The sodium hydroxide aqueous solution was dropped over 4 hours under reflux at an internal temperature of 100 to 120° C., and at the same time, water was removed by azeotropic distillation. After further reaction for 1 hour, the reaction product was subjected to epichlorohydrin removal, washing with water, solvent removal, and filtration, to obtain the following allylphenol novolac-type epoxy resin EP-1. The epoxy equivalent of EP-1 was 214 g/eq.

[Chem. 6]

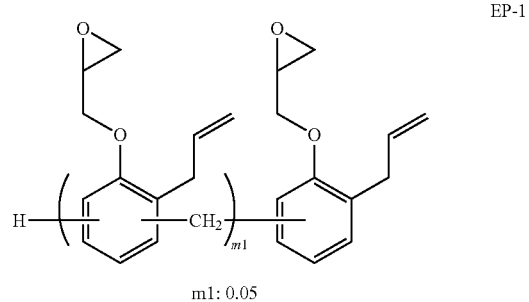

m1: 0.05

Examples 1 to 4 and Comparative Examples 1 and 2

Components shown in Table 1 below were mixed in amounts shown in the Table, to prepare respective curable compositions of Examples 1 to 4 and Comparative Examples 1 and 2.

Each prepared curable composition was applied with a bar coater onto a glass plate having a Teflon (registered trademark) tape attached thereto, to form a coating film of the curable composition. Each formed coating film was pre-cured by light according to the following conditions, and the pre-cured coating film was cured by heat according to the following conditions. The pre-cured coating film and the cured coating film were evaluated as follows.

Curing Conditions:
Pre-Curing by Light:
Using J-Cure 1500CV from JATEC, ultraviolet rays having a wavelength of 365 nm were radiated under a light exposure of 3,000 mJ/cm² at room temperature (25° C.).

Curing by Heat:
Heating was conducted in a heat circulation-type oven at 100° C. for 1 hour, and then at 150° C. for 1 hour.

Evaluation Criteria:
Photocurability:
Samples were rated "A" in cases where curing was sufficient after irradiation with light and it was possible to form a releasable coating film. Samples were rated "B" in cases where curing was insufficient and the coating film could not be peeled. The results are shown in Table 1 below.

Physical Properties of Cured Product:
Using RSA from TA Instruments, the glass transition points (Tg) after photocuring and after heat-curing were measured. A 4-mm wide, 60-mm long, 0.3-μm thick rectangular piece was used as each test piece.

TABLE 1

|  |  | Example 1 | Example 2 | Example 3 | Example 4 | Comparative Example 1 | Comparative Example 2 |
|---|---|---|---|---|---|---|---|
| Component (A) | EP-1 | 10.0 g | 10.0 g | 10.0 g | 10.0 g |  |  |
|  | BPADGE |  |  |  |  | 5.0 g | 5.0 g |
|  | DABPA |  |  |  |  | 5.0 g | 5.0 g |
| Component (B) | T-1 | 11.4 g | 5.7 g |  |  | 7.7 g | 4.2 g |
|  | T-2 |  |  | 8.6 g | 4.3 g |  |  |
| Component (C) | Irg-907 | 0.2 g | 0.2 g | 0.2 g | 0.2 g | 0.2 g | 0.2 g |
| Component (D) | EH-4370S | 1.1 g |  | 0.9 g |  | 0.9 g |  |
|  | EH-5057P |  | 5.0 g |  | 5.0 g |  | 5.0 g |
| Evaluation results | Photocurability | A | A | A | A | B | B |
|  | Tg after photocuring | 44° C. | 32° C. | 36° C. | 30° C. | —*1 | —*1 |
|  | Tg after heat-curing | 71° C. | 73° C. | 92° C. | 83° C. | —*1 | —*1 |

BPADGE: Bisphenol A-type epoxy resin; epoxy equivalent: 180.
DABPA: Bis(3,3'-diallyl)bisphenol A.
T-1: Pentaerythritol tetrakis(3-mercaptopropionate) (liquid form at 25° C.).
T-2: 1,3,4,6-tetrakis(2-mercaptoethyl)glycoluril (liquid form at 25° C.).
Irg-907: Acetophenone-based photopolymerization initiator (product name: Omnirad 907) from IGM Resins.
EH-4370S: Modified amine-based curing agent from Adeka Corporation.
EH-5057P: Modified amine-based curing agent from Adeka Corporation.
*1: Unmeasurable because no test piece could be formed.

The Examples clearly show that the curable compositions containing a compound having an allyl group and an epoxy group, a polythiol compound, a photoradical initiator, and a thermally latent curing agent/curing catalyst are photocurable, and, by further being thermally cured, can provide cured products having excellent physical properties.

INDUSTRIAL APPLICABILITY

The curable composition according to the present invention is curable by both light and heat, and can thus be used for various applications such as liquid encapsulants, liquid adhesives, adhesives for camera modules, liquid crystal sealants, etc.

The invention claimed is:
1. A curable resin composition comprising:
(A) a compound having an allyl group and an epoxy group;
(B) a thiol-based curing agent;
(C) a photoradical initiator; and
(D) at least one compound selected from the group consisting of thermally latent curing agents and curing catalysts,
wherein the compound having an allyl group and an epoxy group is an aromatic epoxy resin having an allyl group, wherein the aromatic epoxy resin is a compound represented by formula (1):

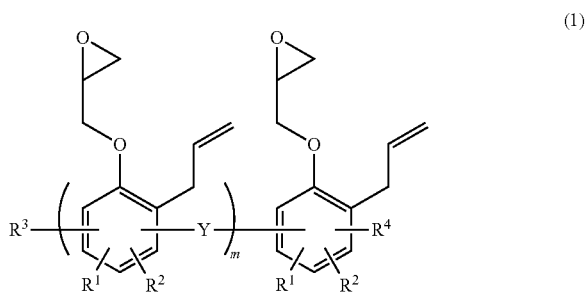

wherein m represents 0 or a positive number, Y is at least one moiety selected from the group consisting of formulae (Y-1) to (Y-3) and (Y-5) to (Y-9) below, and $R^1$, $R^2$, $R^3$, and $R^4$ each independently represent a hydrogen atom, a $C_{1-4}$ alkyl group, an allyl group, or a glycidyloxy group

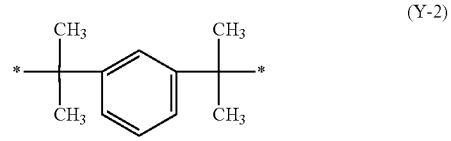

-continued

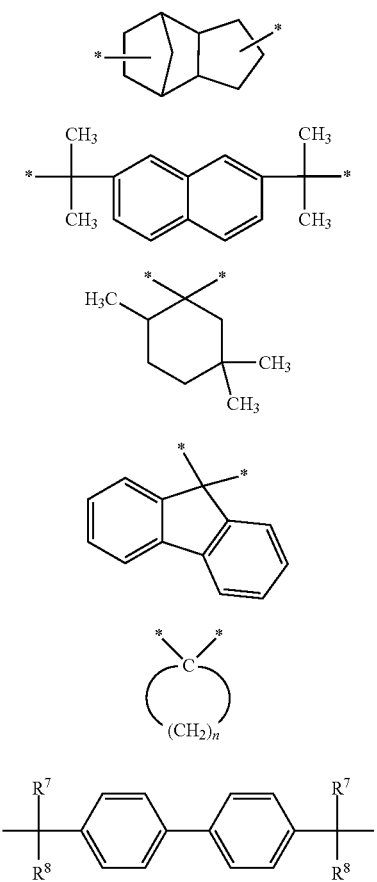

(Y-3)

(Y-5)

(Y-6)

(Y-7)

(Y-8)

(Y-9)

wherein n represents an integer from 4 to 12, $R^5$ and $R^6$ represent a hydrogen atom, $R^7$ and $R^8$ each independently represent a hydrogen atom or an unsubstituted or fluorine-substituted methyl group, and * represents a bonding site, and wherein the component (D) is a modified amine-based curing agent comprising a polyepoxy and/or isocyanate adduct of an amine compound containing at least one active hydrogen.

2. The curable resin composition according to claim 1, wherein the thiol-based curing agent which is the component (B) is in liquid form at 25° C.

3. The curable resin composition according to claim 1, wherein the thiol-based curing agent which is the component (B) is a polythiol compound.

4. The curable resin composition according to claim 3, wherein the polythiol compound is a polythiol ether of a polyol, or a polythiol having a heterocycle containing at least one nitrogen in a ring thereof.

5. The curable resin composition according to claim 1, comprising, per 1 equivalent of the allyl group in the component (A), from 0.5 to 1.5 equivalents of the thiol-based curing agent which is the component (B).

6. The curable resin composition according to claim 1, wherein the photoradical initiator which is the component (C) is at least one compound selected from the group consisting of acetophenone-based compounds, benzil-based compounds, benzophenone-based compounds, thioxanthone-based compounds, and oxime ester-based compounds.

7. The curable resin composition according to claim 6, wherein the component (C) is an aminoacetophenone-based compound.

8. A method for curing a curable resin composition, comprising:
a step of pre-curing the curable resin composition according to claim 1 by irradiating the curable resin composition with light; and
a step of curing the pre-cured curable resin composition by heating the pre-cured curable resin composition.

9. A cured product obtained by first pre-curing the curable resin composition according to claim 1 by light, and then curing the pre-cured curable resin composition by heat.

10. The curable resin composition according to claim 1, wherein Y in the formula (1) is the formula (Y-1).

11. The curable resin composition according to claim 10, wherein $R^1$, $R^2$, $R^3$, and $R^4$ in the formula (1) represent a hydrogen atom.

* * * * *